United States Patent
Friebolin et al.

(10) Patent No.: US 10,782,671 B2
(45) Date of Patent: Sep. 22, 2020

(54) METHOD FOR OPERATING A PASS-THROUGH MACHINE AND A PASS-THROUGH MACHINE FOR EDGE MACHINING AND TRIMMING OF WORKPIECES

(71) Applicant: HOMAG GmbH

(72) Inventors: Manuel Friebolin, Calw-Sth. (DE); Joachim Graf, Voehringen (DE)

(73) Assignee: HOMAG GmbH, Schopfloch (DE)

( * ) Notice: Subject to any disclaimer, the term of this patent is extended or adjusted under 35 U.S.C. 154(b) by 51 days.

(21) Appl. No.: 16/080,982

(22) PCT Filed: Mar. 6, 2017

(86) PCT No.: PCT/EP2017/055166
§ 371 (c)(1),
(2) Date: Aug. 29, 2018

(87) PCT Pub. No.: WO2017/153323
PCT Pub. Date: Sep. 14, 2017

(65) Prior Publication Data
US 2019/0064766 A1    Feb. 28, 2019

(30) Foreign Application Priority Data
Mar. 7, 2016 (DE) .................. 10 2016 203 674

(51) Int. Cl.
*F16P 3/12*    (2006.01)
*G05B 19/406*    (2006.01)
(Continued)

(52) U.S. Cl.
CPC ......... *G05B 19/406* (2013.01); *B23D 59/001* (2013.01); *G01N 21/8851* (2013.01);
(Continued)

(58) Field of Classification Search
CPC ....................................................... F16P 3/12
(Continued)

(56) References Cited

U.S. PATENT DOCUMENTS

| 2006/0072988 A1* | 4/2006 | Hariki .................. B25J 5/02 414/282 |
| 2007/0142952 A1* | 6/2007 | Yamamoto ........... G05B 23/027 700/110 |

(Continued)

FOREIGN PATENT DOCUMENTS

| DE | 10047385 A1 | 4/2002 |
| DE | 102010017857 A1 | 10/2011 |

(Continued)

OTHER PUBLICATIONS

Zmibakov et al, English Translation of DE102014204695A1, 2015, Google Patents, pp. 5 (Year: 2014).*

(Continued)

*Primary Examiner* — Suresh Suryawanshi
(74) *Attorney, Agent, or Firm* — Morgan, Lewis & Bockius LLP

(57) ABSTRACT

The invention relates to a method for operating a pass-through machine (1), in particular a pass-through machine which is provided for use in the manufacture of furniture and components, and to a pass-through machine. In the method, a supplied workpiece (W) is first detected and/or identified using a workpiece detection device (20); handling information (HI) is then output using an information device (30) on the basis of the detected information of the workpiece detection device (20); whereupon an operator of the pass-through machine (1) carries out a handling process on or with the workpiece (W) according to the output handling information (HI); and the handled workpiece (W) is then (Continued)

supplied to a machining device (50) of the pass-through machine (1) using a supply device (80).

17 Claims, 2 Drawing Sheets

(51) Int. Cl.
    *B23D 59/00* (2006.01)
    *G01N 21/88* (2006.01)
    *G06T 7/00* (2017.01)
(52) U.S. Cl.
    CPC .... *G06T 7/0004* (2013.01); *G01N 2021/8887* (2013.01); *G05B 2219/37555* (2013.01); *G05B 2219/49302* (2013.01); *G05B 2219/50064* (2013.01); *G06T 2207/30161* (2013.01)
(58) Field of Classification Search
    USPC .......................................................... 700/177
    See application file for complete search history.

(56) References Cited

U.S. PATENT DOCUMENTS

| 2014/0012409 A1* | 1/2014 | McMurtry | G01B 21/047 |
| | | | 700/180 |
| 2016/0031110 A1* | 2/2016 | Middleton | B26D 5/007 |
| | | | 83/13 |

FOREIGN PATENT DOCUMENTS

| DE | 102013204409 A1 | 9/2014 |
| DE | 102014204695 A1 | 9/2015 |

OTHER PUBLICATIONS

English language translation of International Preliminary Report on Patentability from PCT/EP2017/055166, dated Sep. 11, 2018, 6 pages.

\* cited by examiner

METHOD FOR OPERATING A PASS-THROUGH MACHINE AND A PASS-THROUGH MACHINE FOR EDGE MACHINING AND TRIMMING OF WORKPIECES

TECHNICAL FIELD

The present invention relates to a method for operating a pass-through machine, in particular one for a pass-through machine provided for use in the furniture and component industry sector, and a pass-through machine.

PRIOR ART

For instance, DE 10 2010 017 857 A1 is known as prior art in which a 3D security device and a method for securing and operating at least one machine is described. The device has a 3D sensor for capturing three-dimensional image data of a workstation in which an operator operates a machine. The described device provides a machine which improves the collaboration between man and machine at a cooperative workstation while fully protecting against accident hazards.

Furthermore, new systems for the visualization of two- or three-dimensional image data such as laser display devices, beamers, data glasses or HMDs (Head Mounted Displays) have recently found their way into industrial production, offering new possibilities for the transmission of information.

SUBJECT MATTER OF THE INVENTION

An object of the present invention is to facilitate the handling operation of an operator at a pass-through machine and to simultaneously increase process security.

This object is solved by a method according to claim 1 as well as a pass-through machine according to claim 16.

One of the core ideas of the present invention is to provide a method for operating a pass-through machine in which, using a workpiece detection device, a workpiece is detected and/or identified and based on the ascertained information of the workpiece detection device, handling information is output to an operator of the pass-through machine by means of an information device.

By means of the proposed method, current handling information can be displayed to the operator of the pass-through machine during the operation of the pass-through machine. Thus, it is possible, for example, to immediately display defective workpieces and/or handling errors to the operator, which facilitates the handling of the pass-through machine as well as positively contributes to the reduction of the rejection rate of defective parts.

According to one preferred embodiment of the present invention the method serves the operation of a pass-through machine for edge machining or edge machining and trimming of workpieces which preferably consist of wood, wood materials, synthetic materials or the like. The method comprises the following steps: performing a detection and/or identification of a workpiece in a monitoring area of the pass-through machine, performing an output of handling information by means of an information device to an operator on the basis of the information ascertained by means of the workpiece detection device, preferably performing a handling by an operator in accordance with the output handling information and subsequent feeding of the handled workpiece to a machining device of the pass-through machine.

In this manner, a method is provided with which a detection and/or identification of a workpiece in a defined monitoring area of the pass-through machine can be performed and based on the ascertained workpiece-specific information, a handling information can be output to an operator of the pass-through machine.

Thus, for example, it can be detected by the workpiece detection device whether the detected workpiece corresponds to a target workpiece, i.e. whether, for example, the workpiece number detected by means of the workpiece detection device concurs with a workpiece number in a machining plan, and confirming that the detected workpiece is actually supposed to be fed to the next machining device of the pass-through machine. If the detected workpiece corresponds to the target workpiece, a positive confirmation can be displayed to the operator by means of the information device.

Preferably, the workpiece in the monitoring area, which is to be detected by the workpiece detection device was already manipulated by a machining device of the pass-through machine. After a workpiece was manipulated by a machining device of the pass-through machine and before this workpiece is manipulated again by a further or the same machining device, it is detected and/or identified by the workpiece detection device.

In particular, the detection and/or identification of the workpiece occurs at a location of the pass-through machine at which the workpiece is supposed to be handled or manipulated by the operator in a next step.

Thus, in this case, the workpiece detection device can detect that there is a defect with the detected workpiece and it can be correspondingly displayed using the information device to the operator how he must proceed with the defective workpiece, for example, it must be subjected to a post-processing before it can be fed into the further processing sequence again.

In one embodiment of the present invention, the monitoring area is restricted to an area of a return transport device with which the workpieces are transported to the operator following a completed manipulation or machining by means of an upstream machining device.

The workpiece detection device can thereby detect and/or identify the workpieces during transport on the return transport device and/or can detect and/or identify the workpieces at standstill if they are temporarily stored in a buffer of the return transport device. As stated below in detail, the monitoring area can not only comprise the return transport device, but rather can also in principle comprise all areas of the pass-through machine such as, for example, depositing areas, stacking locations, run-off areas, machining areas, any types of conveyor areas and the like.

Preferably the information device visually outputs the handling information to the operator. For example, this can occur using at least one screen and/or at least one laser display device and/or at least one beamer or projector. In particular, the latter three thereby offer the advantage that the handling information can be projected directly onto a location within the pass-through machine and consequently can be directly displayed on location to the operator, which reduces the likelihood that the operator overlooks the handling information. In this regard, it is also possible to use data glasses or HMDs (Head Mounted Displays). Moreover, there is the possibility of outputting the handling information acoustically and/or haptically.

Furthermore, the handling information can be projected directly onto the workpiece or visually displayed in a depositing area of the pass-through machine. Thus there is, for example, the possibility of configuring the depositing area as a display and displaying the respective handling information using the display.

It is preferably possible to display the handling information in the form of a depiction of the outer contour of the respective workpiece, i.e. the outer contour of the target workpiece, in the depositing area of the pass-through machine. It is thereby also conceivable to visualize the correct placement position of the workpiece within the depositing area. The correct orientation of the workpiece can also be displayed thereby. Which in turn contributes to a reduction of handling errors.

In a preferred embodiment, following the placement in the depositing area of the workpiece handled by the operator, a testing of the performed handling is carried out using a testing device. In particular, the position and orientation of the placed workpiece can be checked thereby. Furthermore, it is possible to test whether the workpiece was damaged by the operator during the carried out handling.

If the testing device recognizes that the performed handling by the operator corresponds to the handling information displayed by means of the information device, the testing device authorizes the handled workpiece for a subsequent machining step. Correspondingly, for example, the handled workpiece can, for example, be fed to a further machining device by means of a conveyor.

During the testing, in particular, the position and/or the orientation of the workpiece in the depositing area can be tested, by which an incorrectly oriented placement of the workpiece can be recognized and an erroneous machining of the workpiece in a subsequent machining device can be avoided. Using the testing device it can also be tested whether the correct workpiece was inserted by the operator.

The workpiece can preferably be detected by the workpiece detection device by means of an identification system or by means of reading out a coding.

Using the workpiece detection device, it is possible to detect at least one of the following pieces of information of the workpiece: a measurement, orientation, position in space, position, mass, presence as well as position and/or alignment of a label, of a marking, of a barcode, of a fitting, of a groove and/or a drilling pattern on the workpiece. Furthermore, the surface characteristics and/or the type of finishing of the workpiece can be detected. On the basis of the described properties of the workpiece, it is preferably possible to exactly identify the detected workpiece.

Thus, preferably using detected measurements of the workpiece or detected measurements and/or the shape of the workpiece, and/or a coding applied to the workpiece, an identification of the workpiece can occur.

As far as coding is concerned, this can occur in the form of a barcode, a QR code or an RFID chip. This is particularly advantageous if the detection and/or identification of the workpiece occurs in an environment in which a visual detection by means of, for example, the outer contour is not possible or cannot be steadily realized.

By means of an image processing device, the testing device performs the testing for the correctness of the handling performed by the operator.

In principle, the identification system of the workpiece detection device as well as the testing device of the present invention can be configured in the form of an image processing device. The image processing device being able to be understood as a device which only has the pure detecting function (for example, a CCD sensor) as well as a combination of components which manage the pure image detection as well the processing of detected signals or images (i.e. an image capture and processing device), for example, a camera having an integrated processing and/or evaluating device or a combination of a camera and a processing and/or evaluating device connected thereto, for example, in the form of a software of a control and regulation device.

Furthermore, the image capture devices of the workpiece detection device and/or the testing device can be realized using, for example, several cameras which can be arranged at different locations of the pass-through machine in order to improve the detection precision as well as to enlarge the detection area or the monitoring area.

Furthermore, if a handling error by the operator is detected by means of the testing device, an acoustic, a haptic and/or a visual signal can be output, with the output signal preferably comprising additional correction information. On the basis of which an instruction for the correction of the defect is displayed to the operator after recognition of a handling error or a deviation from the target condition. It can thereby be displayed to the operator, for example, that the workpiece is to be subjected to post-processing, that the workpiece is to be placed in the correct orientation, or that the workpiece is to be removed as a defective part.

To reduce the required hardware and acquisition costs, the detection and/or identification of the workpiece and the testing of the performed handling can be carried out by the same device. I.e. the workpiece detection device and the testing device can be realized using one device, in particular with regard to the processing device and/or evaluating device.

Moreover, the present invention is directed at a pass-through machine, in particular at a pass-through machine for edge machining or edge machining and trimming of workpieces. In this regard, the pass-through machine has a monitoring area, a workpiece detection device which is configured to detect and/or identify workpieces that are in the monitoring area, and an information device which outputs handling information based on information ascertained by means of the workpiece detection device. The ascertained information and the output handling information each forming a unit which belongs to a specific workpiece.

Furthermore, the pass-through machine has a feeding device for feeding the workpieces to a machining device of the pass-through machine.

In this manner, a device can be provided with which workpieces which are supposed fed using a feeding device to a machining device of the pass-through machine, and were previously subjected to a manual handling by an operator, are detected and/or identified, by which it can be ensured that the correct workpieces are fed to the pass-through machine in a correct sequence.

According to one preferred embodiment of the present invention, the feeding device is connected with a circulating device which is configured to move or to transport a workpiece from one outlet of the pass-through machine to the feeding device.

Furthermore, the workpiece detection device of the pass-through machine is configured in the form of an image processing device or a read-out device which reads out a coding provided on the workpiece.

Moreover, the information device can be configured in the form of at least one display and/or at least one laser display device and/or at least one beamer or projector. Using the latter three examples, the handling information can thereby be directly projected onto a location within the pass-through machine, in particular, directly onto the respective workpiece. Furthermore, the information device can be configured in the form of a loudspeaker or headphones and/or a keyer such as, for example, a data glove.

DETAILED DESCRIPTION OF THE PREFERRED EMBODIMENTS

In the following, with reference to the enclosed figures, preferred embodiments of the present invention are described. Further variants and modifications of individual features cited in this context can each be combined with one another in order to form new embodiments.

Figure 1:
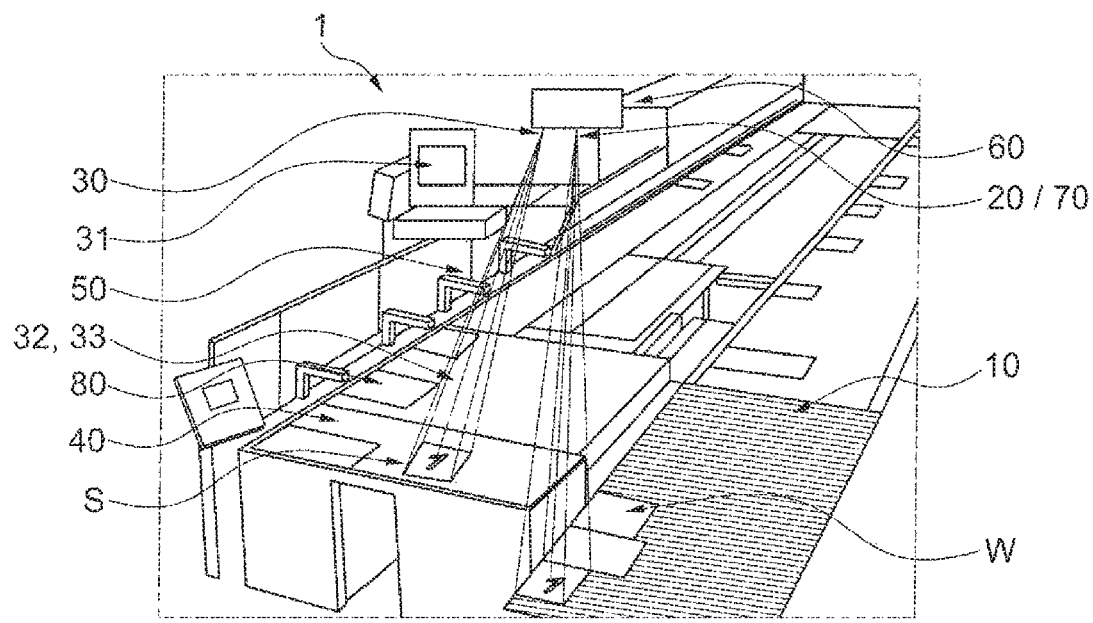
FIG. 1 shows a perspective view of an embodiment of a pass-through machine according to the present invention.

FIG. 1 shows a perspective view of an embodiment of a pass-through machine according to the present invention.

As revealed by FIG. 1, according to one embodiment of the present invention, the pass-through machine 1 has a monitoring area 10, a workpiece detection device 20 and an information device 30. The workpiece detection device 20 is thereby arranged above the monitoring area 10 so that a workpiece W fed into the monitoring area 10 can be recognized. If a fed workpiece W is recognized by the workpiece detection device 20 which optionally was already machined by the machining device 50 of the pass-through machine 1, a detection and/or identification of the workpiece W using the workpiece detection device 20 occurs in the next step. In this regard, the workpiece detection device 20 is equipped, for example, with a camera which monitors the monitoring area 10. However, several cameras can also be used which, in particular, can be installed at different locations in the pass-through machine in order to detect the workpiece W from different angles. In this manner the accuracy of detection can be increased further.

Detection is understood to be, for example, that a measurement, orientation, position in space, position, mass, presence as well as position and/or alignment of a label, of a marking, of a barcode, of a fitting, of a groove and/or a drilling pattern on the workpiece W is or are detected. By contrast, identification is understood to be that using certain features such as, for example, the measurements of a workpiece or an applied coding on the workpiece, a clear identification or assignment of the workpiece W is possible and occurs.

In the embodiment shown in FIG. 1, the monitoring area 10 is limited to a buffer which is configured in the form of a roller table. This roller table serves to temporarily store workpieces W which are fed from a return transport device or a conveyor, until an operator can remove them.

When feeding workpieces W, in particular workpieces W which have already been previously machined by a machining device 50 of the pass-through machine 1, it can occur that workpieces W have not been fed in an order as desired for an optimal further process control. In such a case, using the information device 30, for example, a handling information HI can be output to the operator, which displays that he is not supposed to remove the front-most workpiece in the buffer next, but rather, for example, the workpiece W which was fed first. It is thereby possible for the operator to safely and efficiently perform more complicated machining processes which are avoided on conventional pass-through machines in order to avoid unnecessary operating errors.

Furthermore, using the information device 30 as shown in FIG. 1, handling information HI can be output on a workbench or a depositing area 40, of a feeding device 80 of a machining device 50 of the pass-through machine 1. In the shown embodiment, the information device 30 is arranged centrally above the monitoring area 10 and the depositing area 40. Thus, the information device 30 can project a handling information HI directly onto the depositing area 40 and, if desired, onto the monitoring area 10 or onto the workpiece W in the monitoring area 10. This eliminates the need for additional information output devices such as displays, tablets, etc., through which the workstation can be more ergonomically formed for the operator since the operator receives the handling information HI directly at the desired location. There is also the possibility of projecting the handling information directly onto the respective workpiece.

If, in a subsequent step after the detection or identification of a workpiece W in the monitoring area 10, an operator is shown by means of handling information HI that he is supposed to remove a specific workpiece W from the monitoring area 10 and is supposed to place it in the depositing area 40 at a specific location, optionally with a specific orientation, a testing of the performed handling occurs after performance of the handling by the operator. The testing occurs in the embodiment shown in FIG. 1 using a testing device 70, which is also preferably arranged centrally above the monitoring area 10 and the depositing area 40. It is also possible to realize the testing device 70 and the workpiece detection device 20 using the same device 60, for example, using the same cameras.

If the monitoring area and the depositing area or the testing area are too far from one another, different image capture devices (for example, cameras) can also be used and only the processing device and/or evaluating device can be configured together.

If the testing device 70 then finds within the scope of the test that the handling performed by the operator does not correspond to the displayed handling (handling information HI), or the placed workpiece has a defect, a control or regulation unit of the pass-through machine 1 can react thereto accordingly. Thus, there is the possibility that if the operator, for example, has placed an incorrect workpiece W in the depositing area 40, or the operator has placed a workpiece W at an incorrect location in the pass-through machine 1, or the operator has placed the workpiece 1 in the depositing area 40 with an incorrect orientation, a new handling information HI is displayed to the operator by means of the information device 30, which instructs the operator to carry out a correction.

Figure 2:
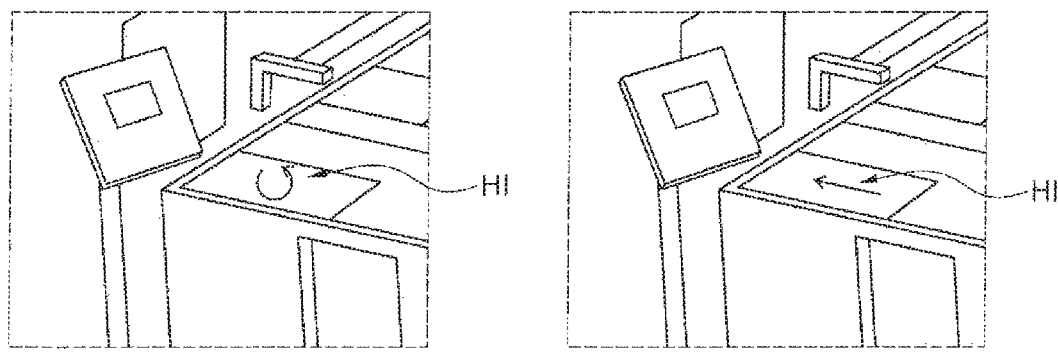
FIG. 2 shows two examples of a possible handling information (HI) which is directly projected onto a workpiece.

As illustrated in FIG. 2, it is possible after an error has been recognized, for example, to display to the operator by means of an arrow which is projected directly onto the workpiece that he must correct the orientation of the deposited workpiece. There is also the possibility of displaying to the operator that the placed workpiece is supposed to be placed a little more to the left or right in the depositing area or in a different depositing area of a different processing machine.

Figure 3:
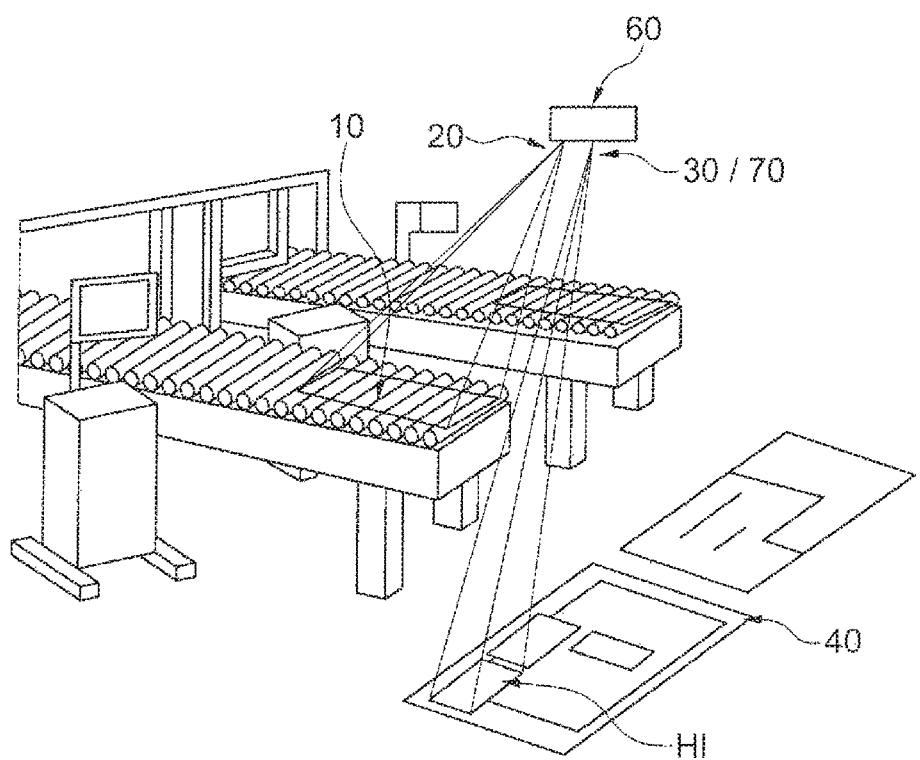
FIG. 3 shows a perspective view of an embodiment of an outlet of a pass-through machine according to the present invention.

FIG. 3 shows a further embodiment of the present invention. As shown, a workpiece detection device 20 and an information device 30 can also be used with the stacking of machined or finished workpieces for the pass-through machine 1 according to the invention. In the shown embodiment, the pass-through machine 1 additionally comprises a monitoring area 10, a workpiece detection device 20, an information device 30 and a testing device 70. As shown, however, in the case of the use within the scope of stacking, the monitoring area 10 is limited to a buffer or run-off area of the pass-through machine 1. The machined or finished workpieces W, which are to be stacked manually by an operator, are fed. Accordingly, a certain area (stacking location), preferably a pallet, is defined as a testing area which is monitored by the testing device 70. There is also the possibility that several stacking locations are provided here.

If a machined or finished workpiece W is then fed into the monitoring area 10, a recognition of the fed workpiece by the workpiece detection device 20 occurs, which triggers a detection and/or identification of workpiece W. Here, the detection and/or the identification of the workpiece W can also occur during the transport on a conveyor or the rolling on rollers of the buffer. Independently of the ascertained information of the workpiece detection device 20, the information device 30 outputs a handling information (HI) to an operator. Preferably, in the case of the stacking as shown in FIG. 3, handling information is projected directly onto the stacking location, in particular onto the location (stacking position) at which the respective workpiece W is supposed to be placed. The handling information can thereby comprise the exact stacking position as well as the desired orientation of the placed workpiece W.

After the workpiece W was placed on the stacking location by the operator, a testing of the handling carried out by the operator occurs using the testing device 70, in particular whether the workpiece W was stacked at the correct position as well as with the correct orientation. If the testing device 70 recognizes that the operator has made an error, for example, the workpiece W was placed in an incorrect location or the orientation does not correspond to the desired orientation, the control or regulation unit of the pass-through machine 1 can react accordingly.

Thus, there is the possibility that the operator is shown new handling information (HI) by means of the information device 30, which instructs the operator to carry out a correction. The handling information HI can also be projected directly onto the workpiece W in the form of an arrow or a warning message, as also described above.

There is also the possibility of only displaying the correct placement position as well as the placement orientation by projecting the outer contour of the target workpiece on to the target placement position.

In step one of the method for operating a pass-through machine, a workpiece is recognized in the monitoring area using the workpiece detection device which, for example, visually monitors a monitoring area. The workpiece can thereby be in motion or at rest. By recognizing a workpiece in the monitoring area, the following steps of the method are triggered.

In method step two, a detection and/or identification of the workpiece is performed using the aforementioned workpiece detection device. For example, the external contour, the surface characteristics of the workpiece, the finishes carried out and the like can be determined visually. If a clear assignment of the detected workpiece is possible using the ascertained information, i.e., for example, the assignment to a certain article number or at least to a certain type of workpiece is possible, this is an identification of the workpiece.

If only workpieces that are identical are being machined on the pass-through machine, yet the correct sequence of the machining steps, in particular the machining of the correct side or edge of the workpiece, is decisive, it may be sufficient that only the correct orientation of the workpiece is determined and displayed.

If a workpiece was detected using the workpiece detection device and the workpiece was able to be assigned to a certain article number, which, for example, is to be machined next by a machining device of the pass-through machine, step three occurs. With step three, the operator is displayed a handling information using the information device. In the case described above, it is displayed to the operator that he is supposed to pick up the detected workpiece and place it with the correct orientation in the depositing area of the feeding device of a certain machining device of the pass-through machine.

Next, in step four, the operator performs the handling in accordance with the handling information. I.e. the operator picks up the specific workpiece and places it with the correct orientation in the depositing area.

In step five of the shown embodiment, a testing of the handling performed by the operator is carried out using the testing device. In principle, the current state of the placed workpiece is hereby compared with a stored target state. If the testing device confirms that the handling by the operator occurred correctly, the method is continued with step 8, and the workpiece is fed by the feeding device to a machining device of the pass-through machine.

However, if the testing device recognizes a defect on the workpiece or an error in the handling by the operator, a search for a feasible solution is carried out by the control device of the pass-through machine, and the method is continued with step 6.

According to the solution found by the control device, the information device first displays a warning message to the operator with which the operator is informed of the error that has occurred. Subsequently, or also simultaneously, a request for correction is displayed. If this is not possible, as a rule, it is displayed to the operator to remove the defective part.

In step 7, the operator carries out a new handling in accordance with the displayed prompt for correction, by means of which the error which was made is corrected. Subsequently, step 5 is returned to, in which the testing device is used to check again whether the current state of the workpiece corresponds to the target state.

The invention claimed is:

1. A method for operating a pass-through machine for edge machining or edge machining and trimming of workpieces, comprising the steps:
   detecting and/or identifying a workpiece in a monitoring area of the pass-through machine by means of a workpiece detection device;
   outputting handling information by means of an information device to an operator on the basis of the ascertained information of the workpiece detection device; and
   feeding the workpiece handled by the operator in accordance with the handling information to a machining device of the pass-through machine,
   wherein the workpiece to be detected was already machined by a machining device of the pass-through machine and is moved from an outlet of the pass-through machine to a feeding device for feeding the workpiece to the pass-through machine;
   the monitoring area is determined on an area of a return transport device with which the workpiece are transported to the operator after the occurred machining, of the pass-through machine; and the workpiece detection device detects and/or identifies the workpieces during transport on the return transport device and/or detects and/or identifies the workpieces at standstill if they are temporarily stored in a buffer of the return transport device.

2. The method according to claim 1, wherein the handling information is output visually, in particular by at least one display and/or at least one laser display device and/or at least one beamer which preferably projects or project the handling information onto a location within the pass-through machine, acoustically and/or haptically.

3. The method according to claim 1, wherein the handling information is projected onto the workpiece or visually displayed in a depositing area of the pass-through machine.

4. The method according to claim 1, wherein the handling information is displayed in a depositing area of the pass-through machine in the form of a depiction of the outer contour of the respective workpiece at a corresponding placement position.

5. The method according to claim 1, wherein after placement of the handled workpiece in a depositing area, a testing of the performed handling occurs using a testing device, in particular, the position and orientation of the placed workpiece being tested.

6. The method according to claim 5, wherein a next machining step is initiated if the testing device confirms that the performed handling corresponds to the instructed handling or the instructed handling information, in particular, the position and/or the orientation of the workpiece being checked.

7. The method according to claim 5, wherein the workpiece is detected by the workpiece detection device by means of an identification system or by means of reading out a coding.

8. The method according to claim 5, wherein using the workpiece detection device, at least one of the following pieces of information is detected: a measurement, orientation, position in space, position, mass, presence as well as position and/or alignment of a label, of a marking, of a barcode, of a fitting, of a groove and/or a drilling pattern on the workpiece, surface composition and type of finish.

9. The method according to claim 5, wherein using a detected measurement or measurements and/or the shape of the workpiece and/or using a coding applied to the workpiece, an identification of the workpiece occurs.

10. The method according to claim 7, wherein the coding is carried out in the form of a barcode, a QR code or an RFID chip.

11. The method according to claim 5, wherein the testing for the correctness of the handling performed by the operator occurs by means of an image processing device.

12. The method according to claim 5, wherein if a handling error is detected by means of the testing device, an acoustic, haptic and/or visual signal is output, preferably a correction information being additionally output.

13. The method according to claim 5, wherein the detection and/or identification of the workpiece and the testing of the performed handling is carried out by the same device.

14. A pass-through machine for edge machining or edge machining and trimming of workpiece, comprising:
    a monitoring area;
    a workpiece detection device which is configured to perform a detection and/or an identification of a workpiece when a workpiece is in the monitoring area;
    an information device which is configured, based on information ascertained by the workpiece detection device, to output a handling information; and
    a feeding device for feeding a workpiece to a machining device of the pass-through machine;
    wherein the feeding device is connected with a circulating device which is configured to move a workpiece from one outlet of the pass-through machine to the feeding device;
    the monitoring area is determined on an area of a return transport device with which the workpieces are transported to an operator after the occurred machining, of the pass-through machine, and
    the workpiece detection device is configured to detect and/or identify the workpieces during transport on the return transport device and/or to detect and/or identify the workpieces at standstill if they are temporarily stored in a buffer of the return transport device.

15. The pass-through according to claim 14, wherein the workpiece detection device is configured in the form of an identification system or a read-out device which reads out a coding applied to a workpiece.

16. The pass-through machine according to claim 14, wherein the information device is configured in the form of at least one display, and/or data glasses, and/or a head mounted display, and/or at least one laser display device and/or at least one beamer which projects or project the handling information onto a location within the pass-through machine and/or at least one loudspeaker or headphones and/or a keyer, such as, for example, a data glove.

17. The pass-through machine according to claim 14, wherein the identification system is configured in the form of an image processing device which preferably detects the workpiece using at least one camera, and using a processing device and/or evaluating device ascertains information for the information device.

* * * * *